United States Patent Office 3,220,786
Patented Nov. 30, 1965

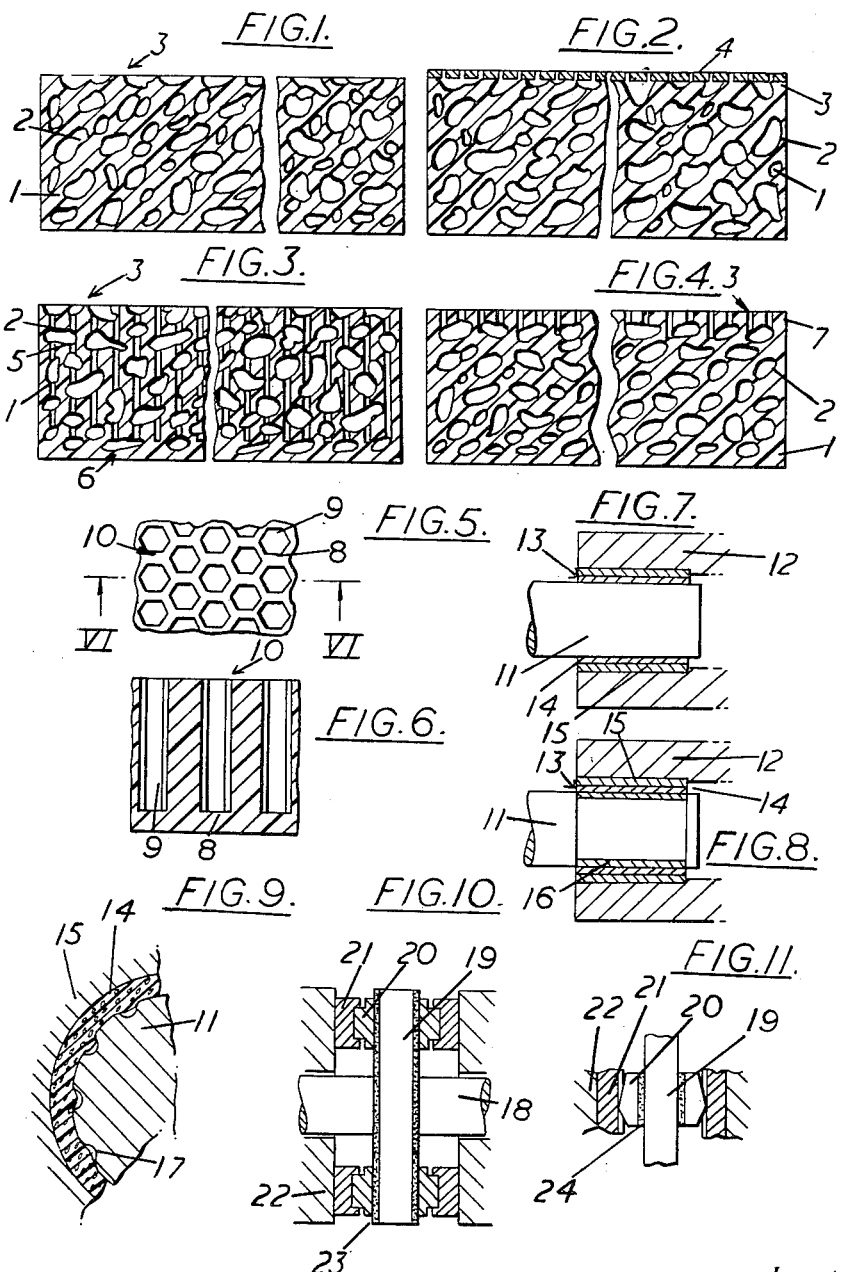

3,220,786
BEARINGS
Charles Walter McCutchen, c/o Cavendish Laboratory
Cambridge, England
Filed Aug. 22, 1960, Ser. No. 50,923
Claims priority, application Great Britain, Aug. 26, 1959,
29,226/59
27 Claims. (Cl. 308—240)

This invention relates to improvements in bearings and has for its object the provision of a new and improved bearing affording low running friction combined with low starting friction.

According to the present invention, there is provided a bearing comprising two relatively movable members, at least one bearing element of a resilient material carried by one of said members, a bearing surface which is provided by said bearing element and in which are provided pores, lubricant contained in the said pores, and means compressing the bearing element and loading said bearing surface into engagement with the other of said members.

In one preferred form of the bearing according to this invention, the or each element may be formed of a closed cell foam rubber or similar material based on synthetic plastics, some of said cells opening at the bearing surface and forming said pores. Such form of bearing may be constructed by trimming a block of the closed cell foam material along a surface in the body of the block intersecting cells therein.

I have found that foam rubber or similar material based on synthetic plastics and having closed cells, when cut so as to present opened cells is capable of holding lubricant, for example soapy water, so that when such a material is drawn across a surface of glass, steel or other material, the coefficient of friction is extranordinarily low because the load is borne largely by the liquid in the cut cells. If the rubbing is continued, say for an hour, the co-efficient of friction rises somewhat as the liquid leaks out between the glass and the material, but is restored to substantially the original value by removing the material from the surface to which it has been applied and re-applying it. Such material with open cells on the bearing side thus constitutes a hydrostatic bearing. In such bearings it is important that the fluid-filled cavities extend all the way to the rubbing surface. Behind these open cells, closed cells improve the resilience. Furthermore, when such a bearing is made by cutting a material having only closed pores, lateral exudation of lubricant when the bearing is under load is avoided or minimised.

According to a further feature of this invention, a material with closed cells which has been cut to provide opened cells on one surface may be pierced in a direction transverse to such a surface so that channels lead into the body of the material from the bearing surface and interconnect cells opening at the latter with other cells within the material. Advantageously, most or all of the originally closed cells are put into communication with the bearing surface. By this means most or all of the liquid in the material is available for making up seepage of lubricating liquid along the rubbing surfaces. Preferably the piercing is not carried to the extent of piercing the back surface of the material. This arrangement provides a unique bearing surface in that it is permeable to lubricating liquid in a direction transverse to the bearing surface but impermeable to lubricating liquid in a direction parallel to the bearing surface.

It is not, however, necessary that the material be permeable in the single direction perpendicular to the bearing surface. A resilient material which is permeable in all directions may be used provided that the permeability is low so as to minimise side leakage under load. If the bearing surfaces are smooth, there will be sufficient exuded lubricant to maintain a film thick enough to avoid heavy contact between the rubbing surfaces. This type of bearing may be called a "weeping" bearing.

As already indicated, the material may be closed cell rubber or synthetic rubber, for example polychloropropane, or a closed cell synthetic material, for example a polyurethane. The pore size is not critical in the sense that it can be varied in accordance with the load which the bearing is to carry. It will, however, be appreciated from the foregoing remarks that the pore size must be chosen in relation to the load to be sufficiently low to ensure that the material has a low permeability and the lubricant will under such load not seep rapidly from the material.

In another convenient form of the bearing according to this invention, the element or elements may be made starting from a material with closed cells and piercing the material at a large number of points from the surface of the structure which is to constitute the bearing surface. The piercing may be such as to open only those cells which are immediately adjacent such surface or alternatively may go deeper into the material so as to make available, as described above, the lubricant content of all or most of the cells in the material. Again such piercing preferably does not extend through the face of the material opposite to the bearing surface.

Thus, according to a further aspect of this invention, there is provided a bearing comprising one or more elements of closed cell foam rubber or similar material based on synthetic plastics, such element or elements providing a bearing surface at which emerge channels leading into the body of the material and intersecting cells in the latter.

A still further alternative form of bearing may be made from a material having a regular cellular structure, the cells opening at the surface and having parallel axes which extend perpendicularly to the bearing surface. The cells may be of any cross section, e.g., square, circular or hexagonal. In constructing a bearing in accordance with the present invention from such a material one end of the cell structure is entirely sealed. This leaves a structure with the bearing surface presenting a series of open cells transverse to the bearing surface. Such structures may be made from any suitable material and preferably a plastic material having some rigidity, for example plastic materials made from linear condensation polymers such as polyamides. It is not essential that the walls of the cells be strictly parallel, indeed for some purposes it is of advantage both as regards manufacture and in use that the cells shall have a cross-section which decreases in area in a direction away from the bearing surface. Such a structure lends itself very readily to formation by injection moulding. This type of cellular structure is porous in the direction perpendicular to the bearing surface and substantially non-porous to the lubricant in the transverse direction.

According to a further feature of the invention, the bearing surface may desirably be covered with a permeable membrane, the pore size of which is capable of permitting passage of the lubricant. Such a porous membrane may be made with any suitable material, for example nitrocellulose, polyvinyl alcohol or other polyvinyl compound, or even of the same type of material as that constituting the sponge proper. A bearing having this feature has the property of being able to exude from the membrane side of a small quantity of lubricant which reduces its coefficient of friction when in contact with any smooth surface, the pores in the material behind the permeable membrane acting as a reservoir for further lubricant. This type of bearing is thus another kind of "weeping" bearing.

The bearings according to this invention, may be applied to sleeve bearings for shafts, thrust bearings or any other type of bearing to which the wellknown porous metal technique has been applied. Since, as previously stated, the coefficient of friction tends to rise with continued use of the bearings according to this invention, they are more particularly applicable to machines where the load is intermittent, for example machines in which a shaft is carried by a main bearing and a floating bearing designed to damp out precession. The latter bearing would be advantageously constructed in accordance with the present invention. The term "intermittent load" is used in this specification to include the case where the load is truly intermittent and also the case where the load is intermittently very low, e.g. in slow running. In applying the bearing of this invention to a shaft or like member normally giving a continuous load, the construction may be adapted so as to give a load which with respect to any particular portion of the bearing surface is intermittent by providing the external surface of the shaft within such a bearing with smooth axial grooves or, in the case of a thrust bearing, by providing the bearing surfaces of the thrust collar of the shaft with radial grooves, the grooves preferably having smoothly rounded edges.

Shaft bearings, according to the present invention, may be simple pads arranged at intervals in a main metal bearing so as to contact the shaft at intervals round its periphery. Alternatively, the bearing may be a continuous pad, that is to say an annulus, inside the main metal bearing. If desired, particularly in the case of the weeping bearings, i.e. those carrying permeable membranes, both bearing surfaces may be provided with the new type of bearing. For example, a sleeve bearing may be lined on the inside with such a bearing and, in addition, the shaft itself may have such a bearing surface applied to it, for example, within a groove cut for the purpose in the shaft.

In order that this invention may more readily be understood, reference will now be made, by way of example, to the accompanying drawings in which:

FIGURES 1 to 4 are cross-sections through four different forms of bearing element for use in bearings according to this invention;

FIGURE 5 is a plan view of a fifth form of bearing element;

FIGURE 6 is a cross-section on the line VI—VI of FIGURE 5;

FIGURES 7 and 8 are fragmentary longitudinal sections through two forms of shaft bearing according to this invention;

FIGURE 9 is a fragmentary cross-section through a modified form of the bearing of FIGURE 7; and FIGURE 10 is a fragmentary section through a Mitchell or Kingsbury tilting pad thrust bearing according to this invention; and FIGURE 11 is a fragmentary section in a plane at right angles to the plane of the section of FIGURE 10 and illustrating a modification of the bearing of that figure.

Referring to FIGURE 1, there is illustrated an element for a bearing according to this invention, such element comprising a rectangular parallelepipedonal body or block 1 of a foam rubber or similar material based on synthetic plastics and having closed cells 2, the block having been cut along a surface parallel to one of its faces to provide a bearing surface 3 at which some of the cells 2 open.

FIGURE 2 shows a similar element in which the surface 3 is covered with a membrane 4 permeable to the lubricant to be used in the bearing so as to form an element for a "weeping" bearing.

FIGURE 3 shows an element similar to that of FIGURE 1, but in which piercing members, e.g. pins, have been pressed into the bearing surface 3 so as to provide channels 5 leading into the body of the material from the bearing surface and interconnecting the cells 2 which open at the latter with further cells 2 within the material. The channels 5 may extend any desired distance into the block 1 so as to connect more or less of the cells within the material with those opening at the bearing surface. As shown in the figure, these channels do not penetrate through the non-bearing surface 6 opposite to the bearing surface 3.

The element illustrated in FIGURE 4 comprises a block 1 similar to that used to form the element of FIGURE 1, but which has not been cut to provide cells opening at the bearing surface. To connect cells 2 within the material with the bearing surface 3, the latter is pierced to provide channels 7 opening at the bearing surface and intersecting cells within the material. Such channels 7 may extend only a short distance into the block as shown in FIGURE 4 or may extend a longer distance, as the channels 5 of the element of FIGURE 3 so as to intersect more cells within the block.

FIGURES 5 and 6 illustrate a further form of element, this comprising a block 8 of a material similar to that used to form the block 1 of the elements of FIGURES 1 to 4, but having a regular cellular structure. As shown, the cells, indicated by the reference 9, open at a surface 10 which constitutes the bearing surface of the elements and have parallel axes extending perpendicularly to the surface 10. The cells 9 do not extend completely through the block and in this example have a hexagonal cross-section. For ease of manufacture, the cells 9 may taper, the cross-section decreasing away from the surface 10.

The elements of FIGURE 3, FIGURE 4 or FIGURES 5 and 6 may, if desired, have their bearing surfaces covered with a permeable membrane similar to the membrane 4 of the element shown in FIGURE 2.

It will be noted that each of the closed-cellular blocks shown in FIGURES 1–6 constitutes a monolithic structure, i.e. a one piece, integral structure. Furthermore, it will be obvious from FIGURES 1–6, that the bearing element of this invention has a constant porosity in a direction parallel to the surface 3 but a varying porosity in a direction perpendicular to surface 3. That is, the porosity in a perpendicular or radial direction between surfaces 3 and 6 is not constant since the cells open at surface 3 but do not open at surface 6 and also since the radial channels (FIGURES 3, 4, 6) only penetrate partially through the element.

FIGURE 7 illustrates one form of shaft bearing according to this invention. The figure shows a shaft 11 journalled for rotation in a member 12 in the shaft bearing which is indicated generally by the reference 13. The bearing 13 incorporates an element similar to that shown in any of the preceding figures. The element, indicated by the reference 14, is of annular sleeve-like form and forms a liner to a metal sleeve 15 which is secured against rotation in a recess in the member 12. The bearing surface of the element 13 is the inner surface of the annulus and engages the external surface of the shaft 11.

A second form of shaft bearing is shown in FIGURE 8, this being similar to that of FIGURE 7, but having the external surface of the shaft 11 within the element 14 clad with a similar element 16. Preferably, as shown, the element 16 is recessed into the outer surface of the shaft 11.

FIGURE 9 illustrates a modification of the bearing of FIGURE 7 in which the surface of the shaft 11 is, at a position within the element 14, provided with axial grooves 17 which ensure that, as the shaft rotates, all parts of the element 14 are subjected to an intermittent bearing load. The said grooves advantageously as shown have rounded edges and serve to receive lubricant.

Although the bearings of FIGURES 7, 8 and 9 have been illustrated as including an annular bearing element 14, the latter could, if desired, be replaced by a plurality of angularly spaced bearing elements, as could the element 16 of FIGURE 8.

FIGURE 10 illustrates a Michell or Kingsbury tilting pad bearing according to this invention. In this bearing, a shaft 18 carries a thrust collar 19 which bears through tilting pads 20 against sectors 21 in a housing 22. The collar 19 has each bearing face clad with an annular disclike element 23 formed similarly to the element of any of FIGURES 1 to 6, the bearing surface of this element being the outer surface thereof. If desired, the collar may be replaced by a plurality of angularly spaced elements.

FIGURE 11 illustrates a similar bearing to that of FIGURE 10, but in which, instead of the thrust collar 19 being clad, each of pads 20 has its surface adjacent the collar clad with an element 24 similar to that of the element 23. This figure illustrates how the pads 20 may tilt relatively to the sectors 21.

If desired, the bearing surfaces of the thrust collar 19 may, in a manner similar to the shaft 11 of FIGURE 9, be radially grooved to ensure that all parts of each element 24 are subjected to an intermittent bearing load.

The surfaces of bearings according to the present invention may, if desired, be used with any type of lubricant liquid. Further, they may be supplied continuously or intermittently with the lubricant by suitable arrangement of a high pressure small delivery pump which can inject the lubricant either through a hole in the surface of the resilient bearing itself or through a hole in the surface which mates with that resilient surface. A hydraulic accumulator may be provided associated with such a pump, whereby low friction may be maintained for long periods of standing while the pump is not running. By these means the bearings of the present invention can be made to support continuous loads.

The bearings of the present invention are capable not only of running under low friction but also of giving a very low starting friction, similar to that achieved with ball bearings. A thrust bearing according to the present invention thus has considerable advantage over the conventional Michell or Kingsbury thrust block.

I claim:

1. A bearing comprising two relatively movable members, at least one bearing element of a resilient material carried by one of said members, a bearing surface which is provided by said bearing element and in which are provided pores, liquid lubricant contained in the said pores, and means compressing the bearing element and loading said bearing surface into engagement with the other of said members said element being made of a material which is substantially non-porous in the direction along the length of the element and of increasing porosity radially across the element and towards the area adjacent to said surface with the porosity in a radial direction in said area being substantially higher than that in the longitudinal direction, so that said lubricant can seep relatively freely in said radial direction when said surface is under load and whereby seepage of said lubricant in said parallel direction is relatively restricted.

2. A bearing comprising two relatively movable members, at least one bearing element of a resilient closed cell material carried by one of said members, a bearing surface which is provided by said bearing element and at which some of the cells of the material are open, liquid lubricant contained in the said cells which open at said bearing surface, and means intermittently compressing the bearing element and loading said bearing surface into engagement with the other of said members.

3. A bearing comprising two relatively movable members, at least one bearing element of a resilient closed cell material carried by one of said members, such element having a bearing surface, cells opening at such surface, closed cells within the element behind the bearing surface and channels in the element which connect cells opening at the bearing surface with said closed cells within the element, liquid lubricant contained in the said cells which open at the bearing surface, in the said channels and in the said cells within the element which the channels connect with the cells opening at the bearing surface, and means intermittently compressing the bearing element and loading said bearing surface into engagement with the other of said members, said cells and channels being of a size and arrangement such that only slight seepage of lubricant from the material occurs under said load and the major portion of the latter is borne by the lubricant.

4. A bearing comprising two relatively movable members, at least one bearing element of a resilient closed cell material carried by one of said members, a bearing surface provided by said bearing element, said bearing element having therein channels which intersect cells in the element and emerge at the said bearing surface, liquid lubricant contained in the said channels and cells intersected thereby, and means intermittently compressing the bearing element and loading said bearing surface into engagement with the other of said members said cells and channels being of a size and arrangement such that only slight seepage of lubricant from the material occurs under said load and the major portion of the latter is borne by the lubricant.

5. The bearing specified in claim 4 in which a permeable membrane constitutes said bearing surface.

6. A bearing comrpising two relatively movable members, at least one resilient bearing element of a regular cellular structure having cells which have parallel axes, a bearing surface provided by said element perpendicular to the said cell axes, said cells opening at said surface, liquid lubricant contained in the said cells, and means intermittently compressing the bearing element and loading said bearing surface into engagement with the other of said members said cells being of a size and arrangement such that only slight seepage of lubricant from the material occurs under said load and the major portion of the latter is borne by the lubricant.

7. The bearing specified in claim 6 in which a permeable membrane constitutes said bearing surface.

8. A bearing comprising two relatively movable members, a first bearing element of a resilient material carried by one of said members, a second bearing element of a resilient material carried by the other of said members, a first bearing surface which is provided by said first bearing element and in which are provided pores, a second bearing surface which is provided by said second bearing element and in which are provided pores, the pores of both said first and second bearing surfaces being open at said first and second bearing surfaces, liquid lubricant in the said pores of both elements, and means compressing both bearing elements and loading the said first bearing surface against the said second bearing surface with the major part of said load carried by the lubricant.

9. A bearing comprising two relatively movable members, at least one bearing element of a resilient closed cell material carried by one of said members, a bearing surface which is provided by said bearing element and at which cells in said cellular material are open, liquid lubricant contained in the said cells which open at said bearing surface, and means compressing the bearing element and loading said bearing surface into engagement with the other of said members, said cells being of a size and arrangement such that only slight seepage of lubricant from the material occurs under said load and the major portion of the latter is borne by the lubricant said other member being grooved at the position of engagement by said bearing surface so that, as the two members move relatively to one another, the loading of said bearing surface is effectively intermittent.

10. A bearing mounting a shaft rotatably in a member, such bearing comprising a sleeve surrounding the shaft, but radially spaced therefrom, and mounted in the member relatively to which the shaft is rotatable, a lining to said sleeve of a resilient closed cell material, the unstressed thickness of such lining being less than the spacing of the sleeve from the shaft so that the lining is compressed between the said sleeve and shaft, a bearing surface provided by said lining and engaging the said shaft, some of the cells of the material of the lining opening at said bearing surface, and liquid lubricant in said cells opening at said bearing surface, said cells being of a size and arrangement such that only slight seepage of lubricant from the material occurs under said load and the major portion of the latter is borne by the lubricant the surface of the shaft within the said lining being grooved to provide intermittent contact between the shaft and any part of the bearing surface.

11. A Kingsbury tilting pad thrust bearing comprising a thrust collar, a plurality of tilting pads arranged at intervals around each face of the collar, each pad having a surface adjacent to the adjoining face of the thrust collar, a bearing element on each said pad surface, such element being formed of a closed cell material and having a bearing surface which engages the face of the thrust collar and in which are provided pores communicating with cells within the element, and a liquid lubricant contained in the said pores and communicating cells said pores and cells being of a size and arrangement such that only slight seepage of lubricant from the material occurs under said load and the major portion of the latter is borne by the lubricant.

12. A load-supporting bearing element adapted to be positioned between two relatively moving members and adapted to be fixedly attached to a one of said members, said element comprising a lubricating load-bearing surface for slidably engaging the other of said members, said surface being porous to lubricating fluid, a porous region underlying said surface, said surface being in porous communication with said region in a direction perpendicular to the length of said surface, said element having a one-piece integral structure and being substantially non-porous in a direction parallel to the length of said surface and having a substantially higher porosity from said surface to said region in a direction perpendicular to said surface than is the porosity of said element in a direction parallel to said surface, said element comprising a non-bearing surface radially opposite and parallel to said load-bearing surface, said element being non-porous in a radial direction between said underlying region and said non-bearing surface, whereby said element is adapted to contain lubricating fluid in said porous region by restricting seepage of said fluid in a direction parallel to said surface.

13. A bearing comprising two relatively movable members, at least one bearing element of a resilient synthetic plastic cellular material carried by one of said members, a bearing surface which is provided by said bearing element and in which are provided pores, liquid lubricant contained in the said pores, and means compressing the bearing element and loading said bearing surface into engagement with the other of said members, said element being made of a material which is porous to said lubricant to an extent that the lubricant can seep relatively freely in a direction perpendicular to said surface when said surface is under load and seepage of said lubricant in a direction parallel to said surface is relatively restricted, wherein said material is a closed cellular material.

14. The bearing of claim 13, wherein said material comprises cells which are open and interconnected with each other in a direction perpendicular to said bearing surface but said cells are closed with respect to each other in a direction parallel to said bearing surface.

15. A bearing comprising two relatively movable members, at least one bearing element of a resilient synthetic plastic cellular material carried by one of said members, a bearing surface which is provided by said bearing element and in which are provided pores, liquid lubricant contained in the said pores, and means compressing the bearing element and loading said bearing surface into engagement with the other of said members, said element beig made of a material which is porous to said lubricant to an extent that the lubricant can seep relatively freely in a direction perpendicular to said surface when said surface is under load and seepage of said lubricant in a direction parallel to said surface is relatively restricted, wherein said bearing element comprises a molded plastic material and wherein said bearing surface constitutes a cut surface.

16. The bearing element of claim 12, wherein said surface constitutes a machined cut surface.

17. The bearing of claim 2, wherein said element comprises a body portion and a permeable membrane which constitutes said bearing surface.

18. The bearing of claim 17, wherein said membrane and said body portion are of the same material.

19. The bearing of claim 17, wherein said membrane and body portion are of different materials.

20. The bearing of claim 3, wherein said element comprises a body portion and a permeable membrane which constitutes said bearing surface.

21. The bearing of claim 1, wherein said compressing means acts intermittently to compress said element.

22. A load-carrying bearing comprising a first and a second member, said members being relatively movable with respect to each other, a lubricating bearing element mounted between said members and having a lubricating bearing surface slidingly contacting a surface on a one of said members, said element being resilient and constituting a one-piece integral closed-cellular structure with the cells in said structure being closed from each other in a direction parallel to the length of said bearing surface, said element having cells which are open in a perpendicular direction only to said bearing surface whereby said cells which are open constitute a reservoir for lubricating fluid, a lubricating fluid contained in said cells which are open, whereby the cells in said element permit relative free seepage of said fluid in said perpendicular direction towards and away from said bearing surface while relatively restricting seepage of said fluid in said direction which is parallel to the length of said element.

23. The bearing of claim 22, wherein said element constitutes an irregular closed-cellular structure and wherein at least those cells which are immediately sub-adjacent to said bearing surface are open thereto.

24. The bearing of claim 23, wherein said element comprises a non-bearing surface opposite to said bearing surface, and passages which extend through said element generally perpendicularly from said bearing surface towards said opposite non-bearing surface of said element, said passages extending only partially through said element and thereby opening only certain ones of said cells to said bearing surface, others of said cells which are between the open cells and said non-bearing surface being completely closed from each other and from both said surfaces.

25. The bearing of claim 24, wherein said passages extend substantially in close proximity to said opposite non-bearing surface so as to open substantially all said cells which are in a direction perpendicular to said bearing surface.

26. The bearing of claim 22, wherein said element constitutes a regular closed-cellular structure and wherein said element comprises a non-bearing surface parallelly opposite to said bearing surface, said cells opening to said bearing surface and extending perpendicularly thereto towards said opposite non-bearing surface, said cells being closed from each other and from said opposite surface.

27. A machine bearing element formed of a one-piece integral closed-cellular material wherein all the cells are closed from each other, said element having lubricating surface parallelly opposite to a non-lubricating surface, the cells in said element being all substantially closed with respect to the surfaces of said element, said lubricating surface defining a plane which passes through a group of said cells which lie in a generally common plane whereby the cells in said group are open only to said lubricating surface, the open cells in said group constituting a lubricating fluid reservoir, with said open cells providing a relatively free access for such a fluid in a perpendicular direction towards said lubricating surface while restricting seepage of said fluid in a direction parallel to said lubricating surface.

References Cited by the Examiner

UNITED STATES PATENTS

| | | | |
|---|---|---|---|
| 1,553,775 | 9/1925 | Hertz | 15—244.1 |
| 2,093,800 | 9/1937 | May. | |
| 2,228,406 | 1/1941 | Schmidt. | |
| 2,400,091 | 5/1946 | Alfthan. | |
| 2,424,883 | 7/1947 | Habgood | 308—238 |
| 2,507,021 | 5/1950 | La Keg | 308—106 |
| 2,576,073 | 11/1951 | Kropa. | |
| 2,713,699 | 7/1955 | Pooley | 18—53 |
| 2,734,785 | 2/1956 | Toulmin | 308—240 |
| 2,793,919 | 5/1957 | Clapp | 308—240 |
| 2,929,664 | 3/1960 | Hoyer et al. | 308—243 |
| 2,946,094 | 7/1960 | Kawasaki | 308—238 |
| 2,988,406 | 6/1961 | Chih et al. | 308—87 |

DON A. WAITE, *Primary Examiner.*

RICHARD A. DOUGLASS, FRANK SUSKO, ROBERT C. RIORDON, *Examiners.*